Oct. 19, 1943.  A. S. VOLPIN  2,332,282
PLUG VALVE
Filed July 30, 1940  4 Sheets-Sheet 1

A. S. VOLPIN
INVENTOR.

Lester B. Clark
ATTORNEY.

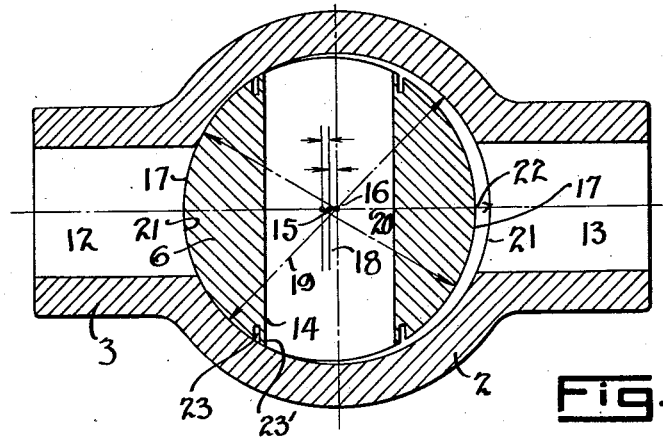
Fig.3
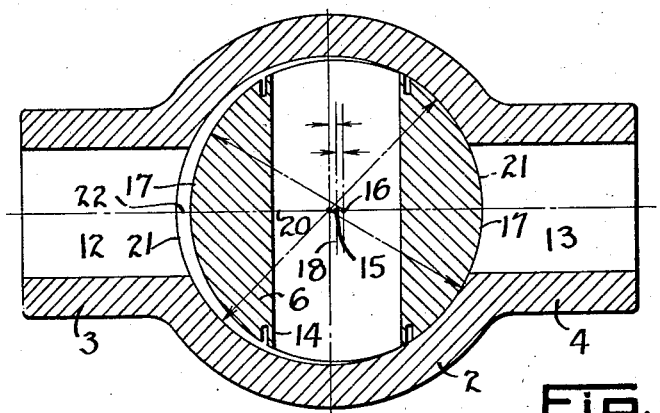
Fig.4
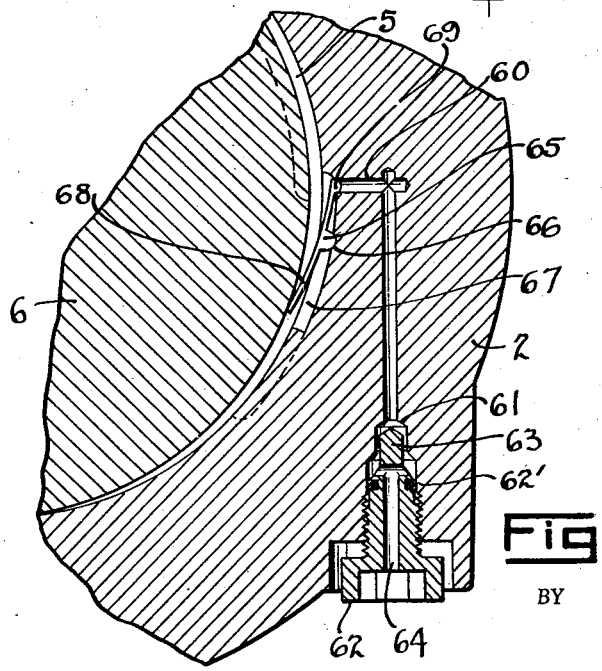
Fig.5
Fig.6
A. S. VOLPIN
INVENTOR.
Lester B. Clark
ATTORNEY.

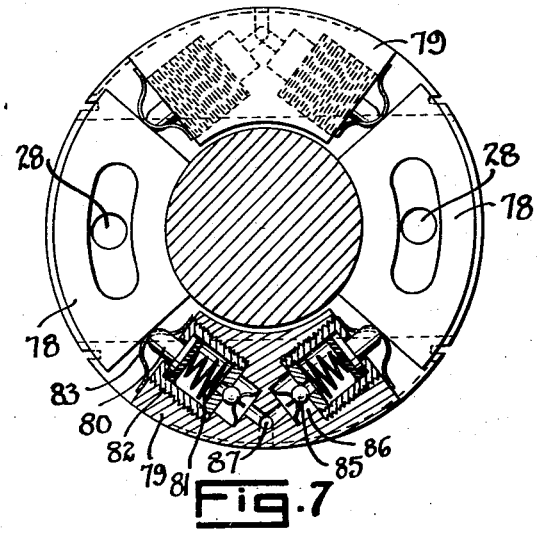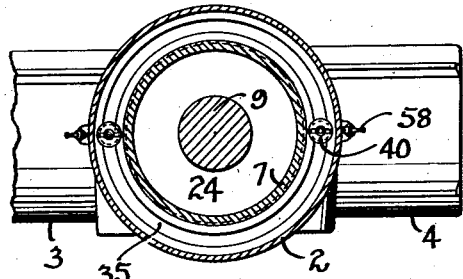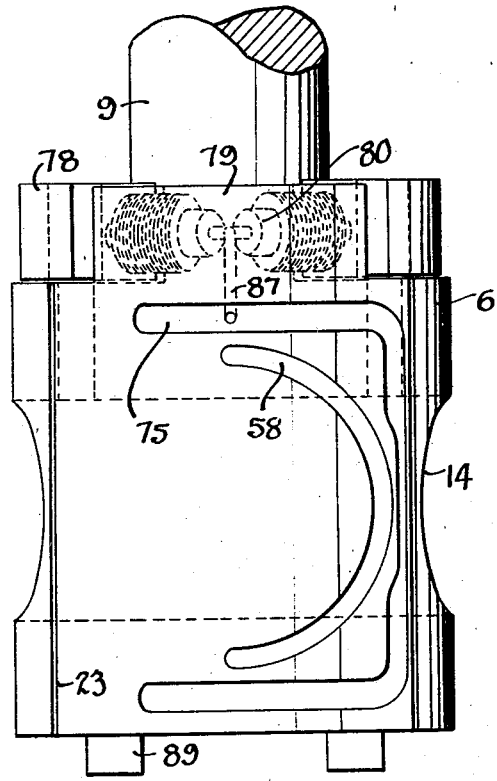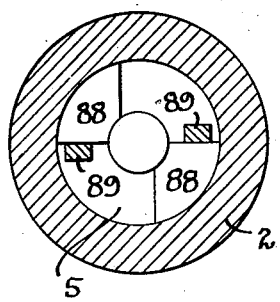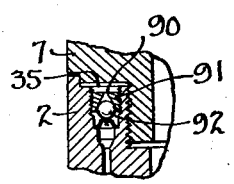

Oct. 19, 1943.  A. S. VOLPIN  2,332,282
PLUG VALVE
Filed July 30, 1940  4 Sheets-Sheet 4

A. S. VOLPIN
INVENTOR.

BY  Lester B Clark

ATTORNEY.

Patented Oct. 19, 1943

2,332,282

UNITED STATES PATENT OFFICE 2,332,282

PLUG VALVE

Alexander S. Volpin, Houston, Tex., assignor to Mission Manufacturing Company, Houston, Tex.

Application July 30, 1940, Serial No. 348,491

3 Claims. (Cl. 251—93)

The invention relates to a plug valve of the lubricated type wherein various advantageous features are added thereto in order to facilitate its operation and to maintain the lubrication and seal between the contacting faces.

It has been found that in the lubrication of plug valves that it is desirable to provide a large quantity of lubricant in the storage reservoir and the present invention contemplates a large reservoir wherein the lubricant is subjected to the pressure in the line so that the lubricant is urged into sealing position at all times by such line pressure.

Another object of the invention is to provide a mechanism for flushing out the lubrication grooves so as to rid them of any foreign matter and insure that there will be a proper distribution of the lubricant.

Another object of the invention is to provide a mechanism wherein a single inlet for lubricant is provided in combination with a distribution system for the lubricant so that such lubricant can flow to the point of least resistance.

Another object of the invention is to provide a lubricated plug valve which is adapted to be properly lubricated on either side thereof regardless of which side is subjected to the higher pressure.

Still another object of the invention is to provide a differential pressure mechanism for admitting the lubricant to the seal faces from the storage reservoir in a lubricated valve so that the lubricant will be fed into the low pressure side to maintain a seal, and excluded from the high pressure side due to the presence of such high pressure.

Another object of the invention is to provide a counter-pressure system for a lubricated valve so that the valve will be unseated automatically when an attempt is made to turn the valve member.

Another object of the invention is to provide a flush-out system for lubricated valves wherein a check is provided for the high pressure side.

Still another object of the invention is to provide discharge ports for the lubrication grooves in a lubricated valve wherein the port on the high pressure side is closed so that only the low pressure side will be subjected to discharge.

Another object of the invention is to provide a plug valve wherein the plug member is provided with a scraping edge which will clean the surface upon which the valve member is to seat.

Another object of the invention is to open the lubricating groove of a lubricated plug valve so that the line pressure on the valve may flush out the lubricating grooves and discharge any lubricant remaining in the lubricant reservoir.

Another object of the invention is to provide a lubricated plug valve wherein a barrier in the lubricating reservoir forms a seal about the stem when the reservoir is empty so that the stem packing may be renewed.

Another object of the invention is to provide a check valve in the discharge from the lubrication reservoir in a lubricating valve so as to exclude the entry of pressure from the high pressure side of the valve into the lubricant in the lubricant reservoir.

Another object of the invention is to provide a restricted orifice for the passage of the lubricant to the seal faces so that there will be an increase in the pressure required to introduce the lubricant when the lubricant reservoir becomes filled.

Still another object of the invention is to provide a separate inlet for the lubricant to the seal faces which is independent of the lubricant reservoir.

Other and further objects of the invention will be readily seen when the following description is considered in connection with the accompanying drawings, wherein:

Figs. 3 and 4 are diagrammatically transverse horizontal sectional views illustrating the manner of obtaining a seal by the off-center curvature of the sealing faces and illustrating the high pressure as applied from the right hand side in Fig. 3 and the left hand side in Fig. 4.

Fig. 5 is a broken detailed transverse section showing the section in the discharge port which is actuated by the position of the valve member.

Fig. 6 is a front elevation looking at the surface of the body member and showing the check valve of Fig. 5.

Fig. 7 is a top plan view looking down on the plug member and the actuating head and illustrating the counter-pressure devices in section.

Fig. 8 is a section taken on the line 8—8 of Fig. 1 and illustrating the distribution grooves for the lubricant.

Fig. 9 is a side elevation of the plug valve and head and illustrating the arrangement of the distribution and counter-pressure lubricant grooves thereon.

Fig. 10 is a section taken on the line 10—10 of Fig. 1.

Fig. 11 is a broken detail sectional view of a modified form of the choke orifice in the differential plunger construction of Fig. 1.

Figure 1:
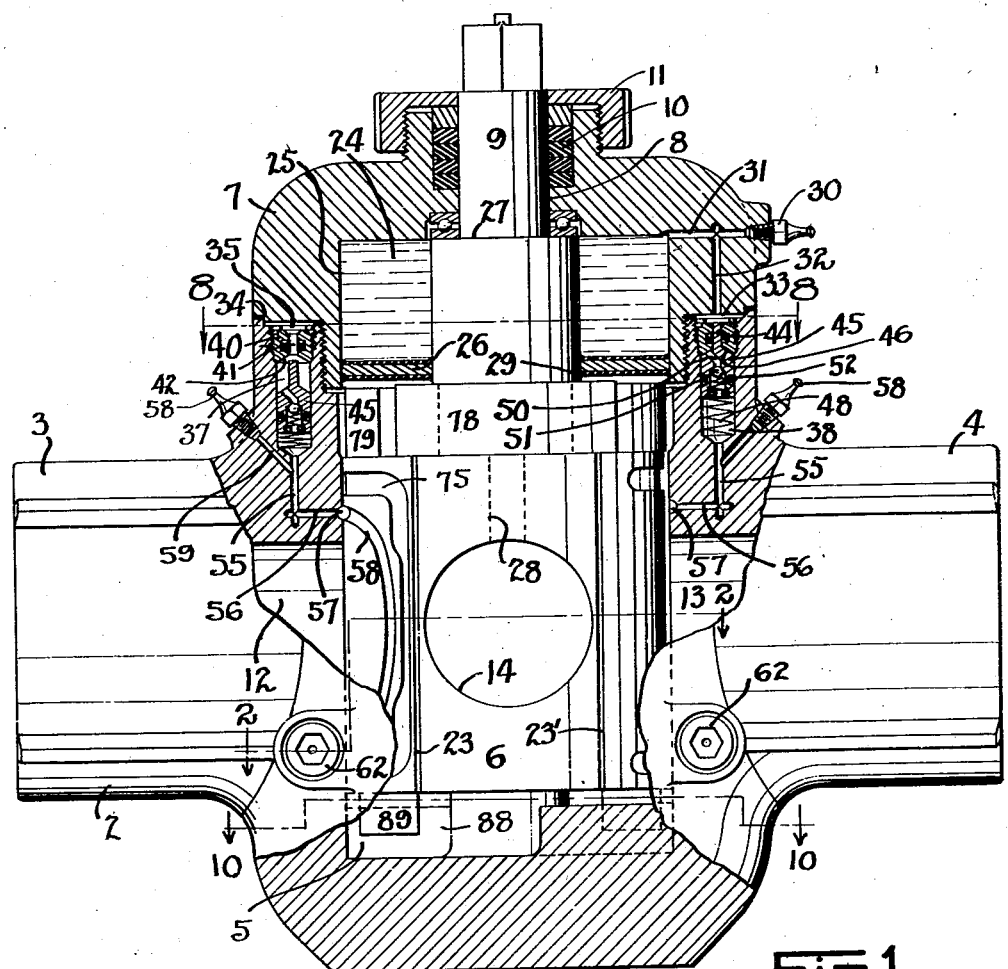
Fig. 1 is a side elevation of the lubricating plug valve embodying the invention and illustrating the valve member in closed position and the lubricant reservoir as being filled.

In Fig. 1 the general assembly of the invention is illustrated and includes a valve body 2 having the pipe line connections 3 and 4 at the opposite end thereof. The body has the valve chamber 5 therein which is arranged to receive the valve or plug member 6. This plug may be constructed as an integral unit or it may be constructed in two segments or halves as desired. The top of the chamber 5 is closed by a bonnet or cap 7, having the opening 8 therethrough for the valve stem 9. A stuffing box 10 forms a seal about the valve stem and is held in position by the cover 11.

The body 2 has the passage 12 at one side thereof and at 13 on the other side which join the chamber 5 so as to form a continuous passage through the valve body. This passage is closed in the chamber by the valve member 6 which in turn has a passage 14 therethrough which is to be aligned with the passages 12 and 13 when the valve is open and is to be positioned transversely of these passages when the valve is closed as seen in Fig. 1.

The valve member may be formed in the manner set out in my co-pending application, Serial No. 330,831, filed April 22, 1940, for a plug and seat for valves wherein the plug is formed by offsetting the center which strikes the arc of the seal surface of the plug member so that the radius of the curvature thereof will be identical with the radius of the curvature of the arc of the seat for such valve member. This particular construction is seen in Figs. 3 and 4 wherein the normal center of the plug is illustrated at 15, and wherein the center 16 which strikes the arc 17 for the sealing surface of the plug on one side is offset from the center 15 by a distance 18, so that the radius 19 which strikes such arc will be identical with the radius 20 which forms the arc 21 of the seat in the valve body 2 so that in effect the valve member is of less width transversely of the passage 14 than it is axially of the passage 14.

In this manner when high pressure is applied through the passage 13 the plug member will move to the left as seen in Fig. 3 so as to form a seal between the identical arcs 17 and 21 at the low pressure side or passage 12, leaving an additional space 22 on the high pressure side. The opposite of the operation is shown in Fig. 4 where the high pressure is being applied through the passage 12 and the valve has moved to seal about the passage 13. This construction is more fully described in my co-pending application above referred to.

With a two part plug member the parts will be urged against the valve chamber by springs between the parts but with a solid one piece plug as here shown it may be desirable to construct the body and the plug of magnetized magnetic metals so that when the valve is installed the high pressure will move the plug to the low pressure side and the magnetic attraction would then retain the plug on that side even in opening and closing. This close contact would prevent grit or foreign matter moving into the seating areas.

Figure 2:
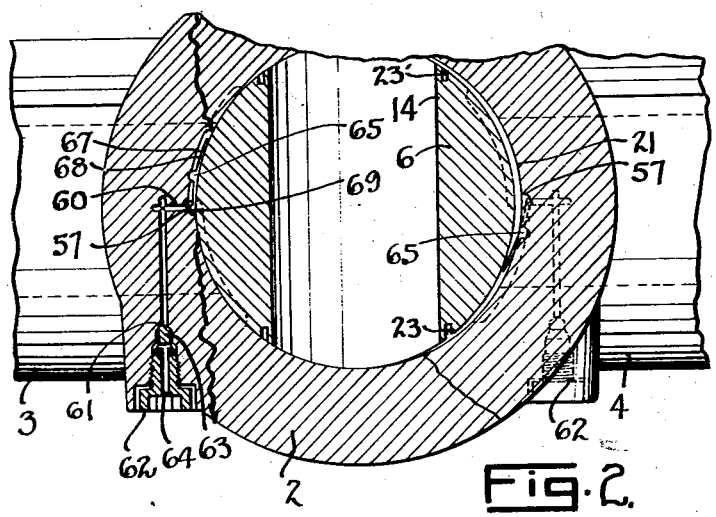
Fig. 2 is a section taken on the line 2—2 of Fig. 1.

A feature of the valve which is utilized to maintain the sealing face as clean as possible is seen in Figs. 1, 2, 3 and 4, wherein a slot or groove 23 is provided in the face of the plug member 6. These grooves, as seen in Fig. 1, are vertically arranged upon the plug and closely approach the side of the passage 14. The groove is so arranged that a rather sharp edge 23' is provided which will scrape against the face of the chamber 5 and tend to remove scale, rust, sediment and foreign material. Material accumulating in these grooves can move by gravity into the bottom of the chamber 5, as seen in Fig. 1. Fig. 2 shows four such grooves, one on each side of each end of the passage 14.

In Figs. 1 and 8 the particular construction of the lubrication reservoir and distribution system is seen. In Fig. 1 the lubricant reservoir 24 is formed by the chamber 25 in the cap or bonnet 7 and is closed at the lower side by a barrier 26 which is in the form of a flat annulus which will preferably have a sealing fit with the wall of chamber 25 and with the circumferential face 27 of the valve stem. This barrier 26 is free to float up and down in the chamber 25 and is subjected to the line pressure in the passage 14 as applied from the high pressure side due to the fact that an opening 28 extends upwardly through the valve member so that the line pressure will be available on the under side 29 of the barrier. This pressure will be applied to the entire surface 29 and will tend to force the barrier upwardly and apply a pressure to the lubricant in the reservoir tending to discharge such lubricant.

The lubricant will be inserted in the reservoir through a fitting 30 and will pass through the port 31 leading through the cap 7 into the reservoir 24. When the lubricant is introduced by pressure applied to the fitting the barrier 26 will be forced downwardly until the chamber is filled, as seen in Fig. 1.

The distribution system from the reservoir to the seal faces of the valve member and the body receives its supply of lubricant from the port 31* which has the additional port 32 connected therewith. This port 32 leads downwardly to a shoulder 33 on the cap 7 and this shoulder in cooperation with a groove 34 in the upper side of the body 2, forms an annular chamber 35 so that the lubricant may flow from the port 32 entirely around the valve chamber 5. This chamber 35 is best seen in Fig. 8.

On diametrically opposite sides of the chamber 5 and over the passages 12 and 13 there have been formed the control chambers 37 and 38. These chambers are vertically arranged in the body 2 and each has a seat nipple 40 therein. These nipples are shown as screw threaded into the chambers and each nipple has an orifice 41 therein and a tapered seat 42 which is in turn arranged to receive the plunger 44 of the differential piston 45 which has a tapered surface 46 to engage the seat 42. This plunger is normally urged upwardly by a spring 48 in the chamber. Pressure applied on the lubricant will force it through the passage or port 32 into the chamber 35 and thence around the body member so that this pressure will be applied equally to the upper end of the plunger 44 on each of the differential pistons in the chambers 37 and 38.

Each of the plungers 45 have an opening 50 therein which is normally closed by a check valve 51 urged upwardly by a spring 52 so that a predominated pressure from above will open the check valve, but a predominated pressure from below will maintain the check valve closed so as to prevent any contamination of the lubricant in the reservoir by a back flow of any material from the line or the valve lubrication or distribution grooves. When the pressure thus applied on the top of the plunger 44 exceeds the pressure applied to the bottom of the piston 45 in the base of the chamber 37 or 38 the differential pressure thereby created will move the plunger downwardly to open the orifice 41 and then open the valve 52 so that a flow of lubricant can pass through the chamber 37 or 38. It seems obvious that where the pressure applied in the chamber is equal on both plungers 44, that either the control chamber 37 or 38 will open, depending upon which chamber is on the low pressure side of the valve.

In Fig. 1 the construction has been arranged with the higher pressure applied to the end at 4 and the low pressure at the left hand end at 3, and it will be observed that the plunger 45 in the chamber 37 is depressed, showing that there will be a flow of lubricant into the chamber 37 and through the plunger 45, whereas the higher pressure in the chamber 38 is maintaining the plunger 45 in closed position.

A passage 55 leads from the bottom of each of the chambers 37 and 38 and joins an inwardly directed branch 56 which leads into the lubrication and sealing groove 57 in the face of the valve body. The same construction is shown in the right hand side of the valve body so that the lubricant will be fed through the control chamber into the face of the chamber 5 along the grooves 57.

In order to maintain a complete seal around the passages 12 and 13 when the valve is in closed position a complementary semi-circular groove 58 is carried on each side of the valve member 6. These grooves are so arranged that when the valve is in the position of Fig. 1 the grooves 57 and 58 form a complete circle about the passages 12 and 13. In view of the fact that the high pressure is on the right hand side, it will be noted that the valve member has been moved laterally a slight distance so that it abuts against the down-stream side of the chamber 5.

The particular construction and arrangement of these semi-circular grooves is set out in the co-pending application of Dudley C. Sharp, Serial No. 318,246, filed February 10, 1940, for Lubricated valves.

In some instances it may be desirable to introduce lubricant directly from the outside of the valve body instead of through the reservoir 24 or the passage 32, and to complete this a fitting 58 is provided at each side of the valve body and has a passage 59 leading into the passage 55 so that lubricant may be forced from outside directly into the grooves 57 and 58.

Fig. 2 shows an arrangement for flushing out the grooves 57 and 58 as well as the reservoir 24, and this mechanism consists of a discharge passage 60 leading from the base of the groove 57. This passage terminates in a seat 61 which is arranged to be sealed by the plug 62. This plug has a solid end 63 and a passage 64 through the plug which opens laterally near the end 63 so that when the plug is unscrewed, as seen in Fig. 5, there can be a flow through the passage 60 and thence through the opening 64 in the plug. A suitable packing 62' may be provided on the plug as seen in Figs. 2 and 5. In the operation of a plug valve of this type, sediment, scale and foreign matter may accumulate in the lubrication grooves such as 57 and 58, and this flushing-out arrangement has therefore been devised so that the fresh lubricant can be forced into the groove and there will be no dead end at the bottom of the groove. Any desired amount of lubricant may be flushed through the grooves directly from the lubricant chamber 24 by merely unscrewing the plug 62 which releases the pressure in the grooves 57 and 58 and the pressure in the control chamber 37 or 38 depending on which plug 62 is opened. The entire quantity of lubricant may be discharged from the reservoir in this manner if desired. It can then be replaced with fresh lubricant or lubricant of a different type.

If it is desired to merely flush out a groove without discharging the lubricant from the reservoir, then pressure can be applied to fittings 58 so long as the predominant pressure is maintained in the grooves over that present in the reservoir 24.

Figs. 2 and 5 show a check valve so as to prevent escape of pressure from the high pressure side of the plug member and this is in the form of a lever 65 which is mounted on a fulcrum 66 in a slot 67 in the face of the chamber 5. This valve has a finger portion 68 which is arranged to abut the valve member regardless of whether it is in the position of Fig. 3 or in the position of Fig. 4. If the valve member is moved away from the check valve 65, as seen in Fig. 5, then the finger 68 will move out of the slot 67 and the valve head 69 will close the passage 60 so as to prevent the escape of any pressure through the up-stream side of the valve where the high pressure is present in event the plug 62 on that side is opened. A similar check valve is provided on the opposite side of the valve chamber and as seen in the left hand side of Fig. 2, this valve is open because the valve member has moved the finger 68 into the slot 67 and has raised the valve head so as to permit the fluid pressure to flow into the passage 20. With this construction an operator who does not know which side of the valve is the high pressure side can flush out the valve by unscrewing both of the plugs 62 and the one from which no pressure escapes will indicate to him that that is the high pressure side. The front elevation of this construction as just described is seen in Fig. 6.

In operating plug valves where high pressures are present it is sometimes quite difficult to turn the valve member while the pressure is present upon it. Various lever mechanisms have been devised with a view of obtaining sufficient leverage to turn the valve.

Figs. 1, 7 and 9, however, show a mechanism for applying a counter-pressure which will tend to overbalance the differential pressure applied to the plug or valve member due to the difference in pressure in the high pressure and low pressure sides of the valve. This counter-pressure mechanism is in the form of a groove 75 which has a C configuration in that it extends horizontally around the face of the plug 6, vertically along the plug adjacent the edge of the passage 14, and then horizontally around the plug for a short distance. As seen in Fig. 9, this counter-pressure groove substantially encloses the semi-circular groove 58 formed in the plug member. It should also be noted that the groove 75 is wider so as to provide a greater pressure area.

In operating the valve member the stem 9 is turned by an outside force and this stem has a pair of laterally projecting lugs 78 thereon. These lugs are arranged to interfit with the up-standing segments 79 on the plug member. Thus, when the valve stem 9 is turned, the lugs 78 engage segment 79 and cause the valve member 6 to turn with the stem. In order, however, to create a predominant pressure in the counter-bore 75 so as to shift the valve member away from its seat and to overcome the high pressure applied to the valve member, I have arranged in the segment 79 a differential area plunger 80. This plunger is normally extended by a spring 81 disposed in the chamber 82 in the segment. A check valve 85 prevents the escape of a fluid from the chamber 86. A passage 87, as seen in Fig. 9, extends from the pressure mechanism into the counter-bore 75.

It will be noted from Fig. 7 that there are two of these pressure mechanisms in each of the segments 79 so that one edge of each of the lugs 78 will engage one of the pressure mechanisms regardless of whether the stem is turned to open the valve or to close it. Any desired force can be applied to the stem and this force can be immediately transmitted to the plungers of the counter-pressure device. These plungers, in turn, move to set up a pressure in the fluid in the counter-bore 75 so that when this pressure is raised to a sufficient amount the pressure in this counter-pressure groove will tend to move the plug member away from its seat. As soon as this seal is broken with the seat the valve member can be readily turned. A spring 83 straddles the end of each of the plungers 80 and is of a strength to normally float the lugs 78 between adjacent springs. Thus the counter-pressure mechanism will only come into action when turning of the plug is opposed by a differential pressure.

In order to limit the turning movement of the valve member the base of the chamber 5 is provided with stops 88 which are arranged to receive the lugs 89 carried on the lower part of the valve member.

Fig. 11 shows a slightly modified arrangement of the differential pressure mechanism in the control chambers 37 and 38, in that the differential mechanism of the control chambers has been replaced by a choke orifice 91 and a check valve 92. The orifice 91 has a very small passage or orifice 90 therethrough which will limit the volume of flow through the device as a function of the applied pressure. This particular form of choke could be applied in the high pressure side of the valve or it can be applied in both sides of the valve.

This choke 91 when used will also serve as an indication to the operator that the lubricant chamber has been filled because when the lubricant is applied to the device the barrier 26 will move to its extended position and the introduction of any additional lubricant would tend to build up a pressure in the lubricant reservoir. Inasmuch as it would require a greater pressure to force any substantial volume of lubricant through the port 90 than to depress the barrier 26, it seems clear that when the step-up of the pressure required to introduce the lubricant through the fitting 30 were noted that it would then be an indication that the lubricant reservoir had been filled.

Particular attention is directed to the large capacity of the reservoir 24 and also the fact that there is only one point of lubrication at the fitting 30 for the lubrication distribution system. It has been found that this is of advantage because many operators may add a large body of lubricant to the up-stream side of the valve member in such a manner that the lubricant is wasted by passing through the groove and into the line which carries the valve.

Figure 13:
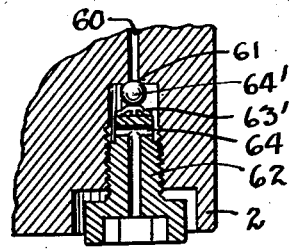
Fig. 13 shows a modified form of flush out plug.

Fig. 13 shows a modified form of the closure or flush out plug 62 of Figs. 2 and 5 wherein the solid end 63 is flattened and a spring 63' and a check valve 64' mounted thereon. The plug can be adjusted to apply the desired pressure to the check valve but the valve may open and permit the flushing of the grooves when sufficient pressure is applied to the grooves. Thus, the plug 62 need not be loosened to accomplish flushing.

Figure 12:
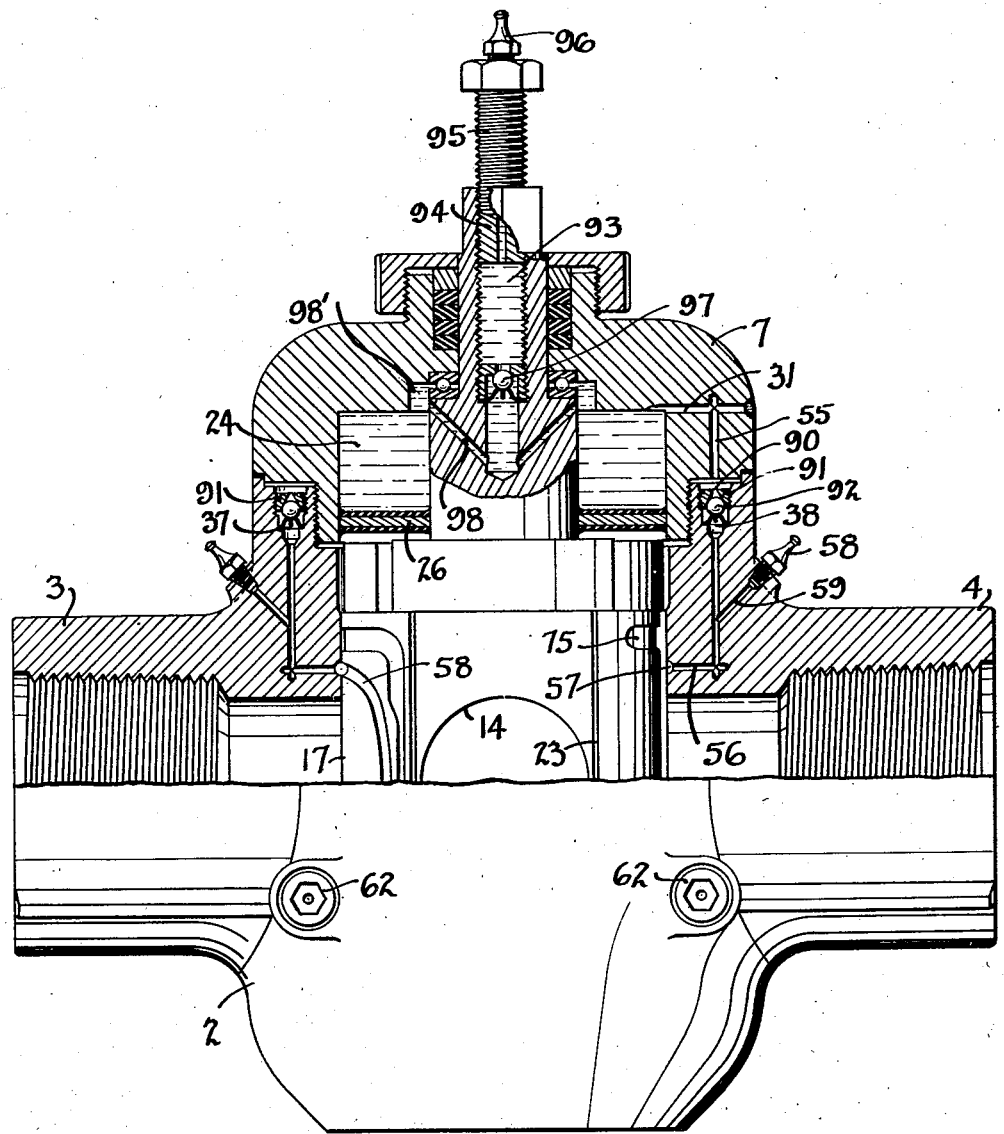
Fig. 12 is a side elevation with certain parts in section of a modified form of valve stem for introducing the lubricant.

In Fig. 12 the same type of construction as is illustrated in Fig. 1 is shown but the valve stem 9 has been modified to some extent in that it has an internally threaded chamber 93 therein which is arranged to receive the lower end 94 of the pressure plug 95 and the fitting 96 so that pressure may be applied to the chamber 93. A check valve 97 is positioned in the lower portion of the chamber 93 and the openings 98 lead from the bottom of the chamber 93 into the top of the reservoir 24. A recess 98' in the top of the cap 7 allows the barrier 26 to move up to the top of the reservoir 24 without blocking off the passages 98. This form of the device allows the use of either liquid or stick form of lubricant and allows the introduction of the lubricant to the reservoir directly through the stem instead of through the cap as seen in Fig. 1.

The type of choke shown in Fig. 11 has been illustrated in each of the control chambers 37 and 38. It seems obvious that the remainder of the structure will operate as described in connection with the previous figures and need not be here repeated. In the operation of this form the lubricant will pass the chokes 90 only when there is a predominant pressure applied to the reservoir 24 which will overcome the differential pressure applied to these check valves on the under side thereof.

Broadly the invention contemplates a lubricated valve wherein line pressure can be applied to a large reservoir to maintain the lubricant; a differential pressure control at the points to which the lubricant will be introduced; the provision of independent fittings to apply pressure to the distribution system; a mechanism for flushing out the lubrication grooves; a check valve for the high pressure side of the valve to prevent discharge of the lubricant; the scraping face of the plug valve member, as well as other and additional features which will be readily apparent from the description and drawings.

What is claimed is:

1. In a lubricated plug valve, means to force lubricant to the sealing faces of the plug and the housing to both the upstream and downstream faces, means normally closing each face against the introduction of lubricant and differential pressure means associated therewith and actuated by the pressure on the high pressure side to maintain that means closed so as to direct the lubricant to the low pressure side.

2. A lubricated valve including a housing and plug, lubricant grooves in the adjacent faces of the plug and housing, means to force lubricant to said grooves, means to open the grooves to discharge through the housing so that the lubricant and foreign matter which may accumulate in the grooves may be flushed out, and additional means to close the grooves on the high pressure side against flushing.

3. A plug valve including a housing, a plug therein, a relatively movable head to turn said plug, means to apply a counter fluid pressure to force said plug laterally upon operation of said head to turn the plug so that the plug is shifted away from the low pressure side of the housing tending to break the seal between the plug and the housing to facilitate turning of the plug, and an independent lubricating system for sealing the faces of the plug and housing.

ALEXANDER S. VOLPIN.